(12) United States Patent
Nozaki et al.

(10) Patent No.: US 7,803,340 B2
(45) Date of Patent: Sep. 28, 2010

(54) PROCESS FOR PRODUCING SIOX PARTICLES

(75) Inventors: Shinji Nozaki, Chofu (JP); Kazuo Uchida, Chofu (JP); Hiroshi Morisaki, Chofu (JP); Takashi Kawasaki, Machida (JP); Masahiro Ibukiyama, Machida (JP)

(73) Assignees: The University of Electro-Communications, Tokyo (JP); Denki Kagaku Kogyo Kabushiki Kaisha, Tokyo (JP)

( * ) Notice: Subject to any disclaimer, the term of this patent is extended or adjusted under 35 U.S.C. 154(b) by 649 days.

(21) Appl. No.: 11/663,586

(22) PCT Filed: Sep. 22, 2005

(86) PCT No.: PCT/JP2005/017466

§ 371 (c)(1),
(2), (4) Date: Mar. 23, 2007

(87) PCT Pub. No.: WO2006/035663

PCT Pub. Date: Apr. 6, 2006

(65) Prior Publication Data

US 2007/0253883 A1    Nov. 1, 2007

(30) Foreign Application Priority Data

Sep. 27, 2004   (JP) ............................. 2004-280053

(51) Int. Cl.
| | |
|---|---|
| C01B 15/14 | (2006.01) |
| C01B 33/20 | (2006.01) |
| C01B 33/12 | (2006.01) |
| C01B 25/00 | (2006.01) |
| C01B 33/00 | (2006.01) |
| C01B 35/00 | (2006.01) |
| C01B 15/00 | (2006.01) |
| C30B 1/00 | (2006.01) |
| C30B 3/00 | (2006.01) |
| C30B 5/00 | (2006.01) |
| C30B 28/02 | (2006.01) |
| C07C 1/00 | (2006.01) |
| C07C 2/00 | (2006.01) |
| C07C 4/00 | (2006.01) |
| C07C 5/00 | (2006.01) |
| C07C 6/00 | (2006.01) |
| B01J 19/12 | (2006.01) |

(52) U.S. Cl. ........................... 423/325; 423/335; 117/4; 204/157.15; 204/157.41; 204/157.45; 204/157.5; 438/797

(58) Field of Classification Search ................. 423/324, 423/325, 335, 337, 348–350; 117/4, 8; 438/795, 438/796, 797; 204/157.15, 157.41, 157.45, 204/157.5

See application file for complete search history.

(56) References Cited

U.S. PATENT DOCUMENTS

| 6,423,585 | B1 * | 7/2002 | Yamazaki et al. | 438/166 |
| 6,685,906 | B2 * | 2/2004 | Fukuoka et al. | 423/325 |
| 2003/0094658 | A1 | 5/2003 | Tamura et al. | |
| 2003/0143377 | A1 * | 7/2003 | Sano et al. | 428/156 |

FOREIGN PATENT DOCUMENTS

| JP | 6-72705 A | | 3/1994 |
| JP | 10294279 A | * | 11/1998 |
| JP | 2001-257368 A | | 9/2001 |
| JP | 2002-76358 A | | 3/2002 |
| JP | 2002-176180 A | | 6/2002 |
| JP | 2003279069 A | * | 10/2003 |

OTHER PUBLICATIONS

Hong-Seok et al. "Excimer Laser Induced Crystallization of Polycrystalline Silicon Films by Adding Oxygen", Jpn. J. Appl. Phys. vol. 36 (1997) 1473-1476.*
Phely-Bobin et al. "Characterization of Mechanically Attrited Si/SiOx Nanoparticles and their Self-Assembled Composite Films", Chem. Mater. 2002, 14, 1030-1036.*
Khriachtchev et al. "Efficient wavelength-selective optical waveguiding in a silica layer containing Si nanocrystals", Applied Physics Letters, vol. 83, No. 15, Oct. 13, 2003, 3018-.*
Rossi et al. "Laser-induced nanocrystalline silicon formation in a-SiO matrices", Materials Science and Engineering B69-70 (2000) 299-302.*
Chen et al., Mater. Res. Soc. Symp. Proc., 2005, vol. 832 pp. F10.21.1-F10.21.6.
Chen et al., IEEE Transactions on Nanotechnology, Nov. 2006, vol. 5, No. 6, pp. 671-676.
Nozaki et al., Surface Science, vol. 601, 2007, pp. 2549-2554.
Nozaki, Novel Properties of SiO Nanoparticles and Their Applications, 2006, pp. 8-12.
Carlisle et al., Journal of Electron Spectroscopy and Related Phenomena, 2001, pp. 228-235.
Sato et al., NanoStructured Materials, 1995, vol. 5 No. 5, pp. 589-598.
J.A. Carlisle et al., Journal of Electron Spectroscopy and Related Phenomena, 2001 Nen, vols. 114 to 116, pp. 228 to 234, '3. Results and discussion'.
S. Sato et al., NanoStructured Materials, 1995 Nen, vol. 5, No. 5, pp. 589 to 598.

* cited by examiner

*Primary Examiner*—Steven Bos
*Assistant Examiner*—Anthony J Zimmer
(74) *Attorney, Agent, or Firm*—Birch, Stewart, Kolasch & Birch, LLP

(57) ABSTRACT

Crystalline silicon particles of nanometer order usable as a semiconductor element are provided by a method for producing SiOx particles, comprising irradiating SiOx (X is 0.5 or more and less than 2.0) particles each including therein an amorphous silicon particle having a particle diameter of 0.5 to 5 nm with light, and preferably a laser beam, to produce SiOx (X is 0.5 or more and less than 2.0) particles each including therein a crystalline silicon particle having a particle diameter of 1 to 10 nm.

3 Claims, No Drawings

PROCESS FOR PRODUCING SIOX PARTICLES

TECHNICAL FIELD

The invention relates to a method for producing SiOx particles having crystalline silicon therein, SiOx powder and a shaped body produced by the production method, and a semiconductor element and a light-emitting element obtained from the shaped body.

BACKGROUND TECHNOLOGY

Silicon particles having a particle diameter of nanometer order have physical and chemical properties, which are considerably different from bulk silicon such as monocrystalline silicon, and are expected to be applied to novel functional materials.

Among the ultrafine particles of a semiconductor, metal and the like, those having a particle diameter smaller than a wavelength (about 10 nm) of electrons, or a nanometer order or less, are known that they have peculiar physical properties different from those of a bulk body because an effect of the finite nature of the size to the movements of electrons becomes large.

For silicon taking the most significant position among various types of semiconductor materials, its particles having a particle diameter, which is miniaturized to a nanosize, are reported that they emit light with a wavelength different from a silicon monocrystalline bulk body, indicating that a band structure and a surface level effect are different from the bulk body (see Nonpatent Literature 1).

Crystalline silicon particles having a particle diameter of a nanometer order or less are in an aggregate form comprising several to several hundred numbers of silicon atoms, and have a particle diameter of several angstroms to several nanometers depending on the number of silicon atoms, which is about 6 angstroms (0.6 nm) in case of, for example, $Si_{10}$.

In terms of the structure, there are also crystalline silicon particles not having a diamond structure other than the crystalline silicon particles having the diamond structure similar to the bulk body silicon monocrystal.

Thus, the crystalline silicon particles can have various sizes and atomic positions and develop different physical properties respectively. Therefore, if the crystalline silicon particles whose size and atomic arrangement are appropriately controlled can be produced, there is a possibility that they can be applied to novel functional materials.

Conventionally, as a method for producing crystalline silicon particles having a particle diameter of a nanometer order or less, there are a method of irradiating an ultraviolet laser beam to a gaseous silicon compound (see Patent Literature 1), a method of performing laser ablation of a silicon target (see Patent Literature 2), a method of growing a crystal after the production of a nucleus of fine Si monocrystalline particles from $SiH_2$ radical in argon plasma (see Patent Literature 3), a method of irradiating a laser beam to a amorphous silicon film (see Patent Literature 4), and the like.

The crystalline silicon particles obtained by the methods of Patent Literatures 1 and 2 are monosilicon particles. The silicon particles obtained by the method of Patent Literature 3 are monosilicon particles and, if necessary, have the surfaces coated with an oxide film, a nitride film or the like. Such crystalline silicon particles have a problem that their arrangement is difficult because they are fine particles of a nanometer order when a semiconductor element is formed by arranging them in a particular pattern on a substrate.

The crystalline silicon particles obtained by the method of Patent Literature 4 are present in an amorphous silicon film, so that it is also possible to form by arranging the particles in a pattern form by a laser beam irradiation method. But, the matrix is not an insulator but semiconductor amorphous silicon similar to the crystalline silicon particles, and the arranged particles and the matrix have similar electrical characteristics, so that it is hard to make them function without modification as a semiconductor element.

[Patent Literature 1]
Japanese Patent Laid-Open Publication No. HEI 06-072705.

[Patent Literature 2]
Japanese Patent Laid-Open Publication No. 2001-257368.

[Patent Literature 3]
Japanese Patent Laid-Open Publication No. 2002-076358.

[Patent Literature 4]
Japanese Patent Laid-Open Publication No. 2002-176180.

[Nonpatent Literature 1]
Nikkei Advanced Technology Report, issued on Jan. 27, 2003, pp 1 to 4

SUMMARY OF THE INVENTION

Problems to be Solved by the Invention

The invention has been made in view of the above circumstances and it provides nanometer order crystalline silicon particles and has an ultimate goal to make it possible to use them as a semiconductor element.

The present inventor has achieved the present invention by obtaining new knowledge that 1 to 10 nm crystalline silicon particles can be formed by irradiating light to SiOx (x=0.5 to 2.0) powder through a variety of studies on methods capable of easily arranging the crystalline silicon particles in a special pattern so as to be usable as a semiconductor element.

The present inventor has also achieved the present invention by newly finding through the above studying process that a semiconductor element which has crystalline silicon particles arranged in a special pattern can be formed in an insulating SiOx matrix and it can be used as a light-emitting element or an electronic part because the crystalline silicon particle is formed within the SiOx particles by forming powder (hereinafter referred to as the SiOx powder), which is formed of the SiOx particles each containing therein the amorphous silicon, into a shaped body (including a film-like or desired-shaped thin massive body) and then irradiating light in a pattern shape to the shaped body.

More specifically, the invention provides 1 to 10 nm crystalline silicon particles and a semiconductor element having the silicon particles arranged in the SiOx matrix and usable as light-emitting elements or electronic parts.

Means for Solving the Problems

The invention is a method for producing SiOx particles comprising irradiating light, preferably a laser beam, to SiOx (X is 0.5 or more and less than 2.0) particles each including therein an amorphous silicon particle having a particle diameter of 0.5 to 5 nm to produce SiOx (X is 0.5 or more and less than 2.0) particles each including therein a crystalline silicon particle having a particle diameter of 1 to 10 nm, and preferably a method for producing the SiOx particles that SiOx (X is 0.5 or more and less than 2.0) particles each including therein an amorphous silicon particle having a particle diameter of 0.5 to 5 nm are obtained by reacting a monosilane gas with an oxidizing gas for oxidizing the monosilane gas under conditions of a pressure of 10 to 1000 kPa and a temperature of 500 to 1000° C.

The present invention relates to SiOx powder comprising the SiOx particles obtained by the above method for producing the SiOx particles and a semiconductor element formed of the above powder.

Besides, the present invention is a method for producing a SiOx shaped body, comprising forming powder, which contains SiOx (X is 0.5 or more and less than 2.0) particles each including therein an amorphous silicon particle having a particle diameter of 0.5 to 5 nm obtained by reacting a monosilane gas with an oxidizing gas for oxidizing the monosilane gas under conditions of a pressure of 10 to 1000 kPa and a temperature of 500 to 1000° C., into a shaped body, and irradiating the shaped body with light, and preferably a laser beam, to obtain a shaped body containing SiOx (X is 0.5 or more and less than 2.0) particles each including therein a crystalline silicon particle having a particle diameter of 1 to 10 nm, and a semiconductor element which is formed of the shaped body obtained by the above method for producing the SiOx shaped body.

In addition, the invention is a light-emitting element which is configured of the above-described semiconductor element.

EFFECTS OF THE INVENTION

The invention provides SiOx (X is 0.5 or more and less than 2.0) powder and a shaped body including crystalline silicon particles having a particle diameter of 1 to 10 nm. The crystalline silicon particles have a nanosize particle diameter, so that they suffer from a large influence of the finite nature of the size to movements of electrons and produce peculiar phenomena such as light emission, electron discharge and the like which are not involved in the Si monocrystalline bulk body. And, the SiOx powder and the shaped body containing therein the crystalline silicon particles according to the invention can provide a semiconductor element and provide effects that they can be used suitably for a variety of uses as a functional material such as a novel light-emitting element, electronic parts and the like.

BEST MODE FOR CARRYING OUT THE INVENTION

The present invention essentially forms a crystalline silicon particle having a particular particle diameter within each of particular SiOx particles by irradiating light to them.

The SiOx particles used in this invention may be SiOx (X is 0.5 or more and less than 2.0) particles each including therein an amorphous silicon particle having a particle diameter of 0.5 to 5 nm, and more preferably 0.5 to 3 nm. The SiOx particles do not depend on the production history if they have the above-described characteristics, but the following method is desirable because they can be obtained easily and stably.

Specifically, the monosilane gas is used as a raw material and oxidized to enable to form SiOx particles at a low temperature, and mixing of impurities, which tends to be produced from a refractory lining or the like in a process of oxidizing a silicon-containing gas other than the monosilane gas, can be minimized. As a result, where the monosilane gas is used as a raw material and oxidized, the SiOx particles produced and the SiOx powder formed of them which are very high in purity and ultrafine can be obtained. In addition, the reason is not known yet but when the process using the monosilane gas as the raw material and oxidizing it is used, it has a characteristic that the SiOx particles used in the present invention can be obtained stably with ease because the amorphous silicon having a particle diameter 0.5 to 5 nm can be included in the SiOx particles in a large range of production conditions.

The monosilane ($SiH_4$) gas used in the above-described process can be commercially available one. The monosilane gas is excellent because it has less load upon the environment than a silane-based gas such as trichlorosilane on the point that it does not have chlorine as a constituent. And, as a monosilane oxidizing gas (hereinafter simply referred to as the "oxidizing gas"), a gas such as $NO_2$, $CO_2$, $H_2O$ or the like having an oxidizing property for monosilane can be used in addition to the oxygen gas and dry air. These oxidizing gases are desired that impurities are removed to the minimum.

The reaction between the monosilane gas and the oxidizing gas is preferably conducted in a non-oxidizing gas atmosphere with a pressure of 10 to 1000 kPa at a temperature of 500 to 1000° C. If the pressure is less than 10 kPa, the produced SiOx has a film form, adheres to grow along the wall surface of a reaction vessel and seals a discharge portion, so that it may become hard to perform a long operation. Meanwhile, if the pressure exceeds 1000 kPa, it is not preferable because a large-scale machine is required to increase the pressure resistance of the reaction apparatus, and the impurities tend to increase. In the above pressure range, a more preferable pressure is 50 to 300 kPa.

If the reaction field has a temperature of less than 500° C., $SiO_2$ tends to be produced mainly, and if it exceeds 1000° C., Si alone tends to be produced easily, and there is a high possibility of mixing a larger amount of impurities from the refractory lining or the like. Thus, it becomes hard to produce high purity and ultrafine SiOx powder in both of the above cases. In the above temperature range, 550 to 950° C. are more desirable, and 650 to 850° C. are in the most desirable range.

The monosilane gas and the oxidizing gas are reacted in the presence of a diluting gas formed of a non-oxidizing gas, if necessary. Thus, the adhesion of the produced SiOx powder to the vessel wall can be reduced. As the non-oxidizing gas, an inert gas such as argon or helium is optimum, but $H_2$, $N_2$, $NH_3$, CO or the like can be used in a range not disturbing the reaction.

In a case where dry air is used as an oxidizing gas, it means that both the non-oxidizing gas and the oxidizing gas are used. The amount of the non-oxidizing gas is desirably larger than a total amount of the monosilane gas and oxygen due to an oxidation reaction of the oxidizing gas, and it is two times or more in molar ratio, and more desirably 10 times or more. Here, the oxygen amount due to the oxidizing reaction of the oxidizing gas is an oxygen amount contained in the dry air when it is used, and when $NO_2$ and $CO_2$ are used, it is an oxygen amount of oxygen atoms configuring them.

As the reaction vessel for oxidation of the monosilane gas, one produced from a highly pure material such as quartz glass can be used. Its shape can have a cup shape with its bottom closed, but a tube shape is desirable, and its disposed direction may be either vertical or horizontal. A method of heating the reaction vessel can be means such as a resistance heating element, high-frequency heating, infrared radiation heating or the like.

The SiOx powder produced in the reaction vessel is discharged together with the non-oxidizing gas and by-product gases from the system and collected by a conventionally known powder recovery unit such as a bag filter.

By varying a ratio between the monosilane gas and the oxidizing gas, the SiOx powder having different an x value or an O/Si molar ratio can be produced under control.

The SiOx particles of the invention have the x value of 0.5 or more and less than 2.0. If the x value is less than 0.5, it is not desirable because the included amorphous silicon particle has a size exceeding 5 nm, and a crystalline silicon particle having a particle diameter of 1 to 10 nm is not produced in the powder even if a laser beam is irradiated. According to the experimental studies by the present inventor, a preferable x value is 0.8 to 1.6. The x value can be obtained by measuring the Si molar quantity in SiOx according to JIS R 6124 (chemical analysis of a silicon carbide abrasive) and also the oxygen molar quantity by an O/N simultaneous analysis apparatus (e.g., "TC-436" of LECO Corp.), and calculating from their molar ratio.

As to the raw material SiOx particles of the invention, the inclusion of the amorphous silicon particle in them and the size of the amorphous silicon particle can be checked according to the presence or not, position and form of peaks attributing to the silicon particle according to the powder X-ray diffraction measurement and Raman spectroscopic analysis. Where the included silicon particle is amorphous, a diffraction line peculiar to the crystalline silicon is not recognized in the X-ray diffraction diagram. And, it has been clarified that a peak position (raman shift value) of the raman spectrum of silicon and a linewidth of the raman spectrum differ from the value of a large silicon crystal as the particle diameter becomes small, and the silicon particle diameter can be calculated by measuring the raman shift value and linewidth (see Appl. Phys. Lett., 60, 2086 (1992), Appl. Phys. Lett., 69(2), 200 (1996)).

Then, a method for obtaining the SiOx (X is 0.5 or more and less than 2.0) particles including therein the crystalline silicon particle having a particle diameter of 1 to 10 nm of the invention from the SiOx particles by irradiating light will be described in detail.

The form of SiOx at the time of the irradiation of light according to the invention may be powder but it is desirably a shaped body such as a film, a thin massive body or the like, because a shaped body which can be immediately applied to usage described later can be obtained easily.

A method for forming such a thin massive body includes, for example, a method of charging powder into a molding die and pressing, a method of forming by additionally performing cold isostatic pressing (CIP), and the like. Meanwhile, a method of forming a film includes, for example, a method comprising producing a slurry by dispersing the SiOx powder into a solvent which has water or an organic solvent and, if necessary, a small amount of a binder dissolved therein, coating the slurry on a substrate, and heating to volatilize the binder and also to dry to solidify it at the same time, and the like.

The shaped body obtained by the above method may be used as it is but may be used after heating and burning to provide it with mechanical strength. But, if the heating and burning are conducted at a temperature of 600° C. or more, crystalline silicon particles start to generate at random in SiOx, and the crystalline silicon particles cannot be formed in a prescribed arrangement in the SiOx, so that it is necessary to heat and burn at a temperature of less than 600° C.

It is essential for the invention to use light, and when light is irradiated, and preferably when a laser beam is irradiated, crystalline silicon particles are formed. Its reason is not known, but it is assumed that the amorphous silicon particles having a particle diameter of 0.5 to 5 nm have a largely different effect of the finite nature of the size upon the movements of electrons, so that they have a peculiar optical responsivity different from a bulk body, and this optical responsivity is responsible for it.

As the light of the invention, the laser beam is particularly suitably used. Its reason is not apparent, but it is assumed that the laser beam is different from other lights and has properties peculiar to the laser, for example, pure and single color light (monochromaticity) without mixing of a variety of light, good coherence (coherence ability) because the phases of light are aligned, or a power density (high output) which is several hundred times larger than that of sunlight when the beam is focused. And, the size of the crystalline silicon particles depends on the wavelength of light, so that when the laser beam is used, the size of the finally obtained crystalline silicon particles can be controlled by selecting its wavelength.

As the light used in the invention, light from a light source such as a metal halide lamp, a halogen lamp, a mercury lamp, an arc lamp, an argon lamp, a krypton lamp, a xenon lamp, a light-emitting diode or the like can be used. Such light may be used as it is but can also be used in monochrome by passing through a filter after spectroscopy or can be used by focusing through a lens. And, as the laser beam, any of a gas laser having an oscillation source using helium-neon, argon, carbon dioxide or the like, a liquid laser using an organic dye solution, a solid laser using ruby, neodymium:yttrium aluminum garnet (Nd:YAG), neodymium:yttrium vanadate (Nd:YVO$_4$) or the like or a semiconductor laser using indium gallium arsenide (InGaAs), indium gallium arsenide phosphor (InGaAsP) or the like can be used.

As to the light, the application of the laser beam will be described mainly. A suitable output value of the laser beam according to the invention is variable depending on an oscillation source type and a laser beam diameter. For example, it is 0.1 to 10 mW when a helium-neon laser having an excitation wavelength of 633 nm is used and 5 to 100 mW when a neodymium:yttrium vanadate laser having a wavelength 532.4 nm is used (using a beam having a diameter of 100 microns in both cases). If the output value is small, the crystalline silicon particle has a diameter smaller than 1 nm or the crystalline particle is not formed. If the output value is larger more than necessary, the crystalline silicon particle is stopped from growing.

Meanwhile, a suitable laser beam irradiation time is variable depending on an oscillation source type and approximately in a range of 10 seconds to one hour. If the irradiation time is short, the crystalline silicon particle has a diameter smaller than 1 nm or the silicon particle is not formed. If the irradiation time is longer more than necessary, the crystalline silicon particle is stopped from growing furthermore.

The irradiated laser beam diameter can be miniaturized to a micron order. Therefore, the irradiation of the scanning line of a fine laser beam to a SiOx shaped body or film can form the SiOx particles each having the crystalline silicon particle therein in a pattern form within a matrix of the SiOx particles having the amorphous silicon particle therein. This technique forms semiconductor crystalline silicon particles in a fine pattern form on the insulating matrix formed of SiOx to enable to use as a semiconductor element such as novel electronic parts. And, the SiOx particles contain crystalline silicon having a size of 1 to 10 nm and have photoluminescence (PL) to emit orange light, so that they are also useful as a light-emitting element.

The size of the crystalline silicon particle in the SiOx particles can be determined from a Raman spectrum in the same manner as the above-described amorphous silicon particles. And, it can be confirmed that the particle is crystalline by X-ray diffraction measurement or observing under a transmission electron microscope (TEM).

EXAMPLES

The invention will be described in further detail with reference to Examples and Comparative Examples.

Examples 1 to 5, Comparative Examples 1 to 3

A monosilane gas, a nitrogen gas and an oxygen gas (each in impurity of 99.999 mass % or more) were prepared and respectively introduced into a quartz glass reaction vessel (an internal diameter of 60 mm and a length of 1500 mm) via a mass flowmeter. The monosilane gas was supplied by passing through a quartz glass monosilane gas introducing pipe (inside diameter of 5 mm) to mix with the nitrogen gas and blowing into the reaction vessel. The oxygen gas was supplied by passing through a quartz glass oxidizing gas introducing pipe (inside diameter of 5 mm) to mix with the nitrogen gas and blowing into the reaction vessel, thereby synthesizing SiOx powder.

The reaction vessel was heated to keep a prescribed reaction temperature by applying power to a nichrome wire heater wound around the outer circumference of the reaction vessel. The temperature was adjusted by measuring the temperature by a thermocouple which is disposed at the center of the middle of the reaction vessel and controlling the power of the nichrome wire heater.

Most experiments were performed under the pressure in the reaction vessel of about 80 to 100 kPa close to atmospheric pressure (101 kPa). Pressure reduction of less than the atmospheric pressure within the reaction vessel was conducted by adjusting the opening of a valve while reducing the pressure by a vacuum pump which was disposed on the exhaust side. The reaction temperatures, pressures and other reaction conditions are collectively shown in Table 1.

The produced SiOx powder was exhausted together with by-product gases and the nitrogen gas through an exhaust pipe and recovered through a bag filter disposed on the way. The recovered powder was examined for the presence or not of crystalline silicon particles by X-ray diffraction measurement.

Then, the molar amount of silicon was measured according to JIS R 6124 (Chemical Analysis of Silicon Carbide Abrasives), the oxygen molar amount was measured by an oxygen-nitrogen simultaneous analysis device (Model TC-436 manufactured by LECO), and value x of the SiOx powder was calculated from their molar ratios.

The powder was measured for a specific surface area by a specific surface area measuring apparatus (BELSORP-mini manufactured by Nippon Bell Co., Ltd.) according to a BET multipoint method.

In addition, the diameters of the silicon particles contained in the SiOx powder were calculated from shift values of Raman spectra of Si measured by a MicroRaman Spectrometer (Model LabRam HR-800 manufactured by JOBIN YVON). The results are shown in Table 2.

TABLE 2

| | Experimental results | | | |
|---|---|---|---|---|
| | Presence of crystalline Si (X-ray diffraction) | X value | Specific surface area $m^2/g$ | Si particle diameter nm |
| Example 1 | NO | 0.9 | 65 | 0.6 |
| Example 2 | NO | 1.6 | 82 | 0.4 |
| Example 3 | NO | 1.1 | 52 | 0.7 |
| Example 4 | NO | 0.6 | 125 | 0.3 |
| Example 5 | NO | 1.0 | 41 | 0.8 |
| Comparative Example 1 | YES | 0.2 | 75 | 10 |
| Comparative Example 2 | NO | 1.8 | 110 | Not detected |
| Comparative Example 3 | YES | 0.9 | 18 | 6 |

The above-described variety of SiOx powders were exposed to a He—Ne laser (a wavelength of 633 nm, output, and an output of 0.1 mW to 10 mW at sample positions) or a neodymium:yttrium vanadate (Nd:YVO$_4$) laser (a wavelength of 532.4 nm, an output of 5 to 100 mW) for a prescribed

TABLE 1

| | Experimental conditions | | | | | | | | | |
|---|---|---|---|---|---|---|---|---|---|---|
| | Reaction temp. °C. | Reaction pressure kPa | Monosilane gas based | | Oxidative gas based | | | Gas amount | Gas mixing ratio | |
| | | | Monosilane L/min. | Nonoxidation based | | Oxygen L/min. | Nonoxidation based | | Total L/min. | Monosilane/ oxygen | Nonoxidative gas ratio*1 |
| | | | | Gas type | L/min. | | Gas type | L/min. | | | |
| Example 1 | 727 | 91 | 0.16 | Nitrogen | 16 | 0.4 | Nitrogen | 1.6 | 18.16 | 0.40 | 31 |
| Example 2 | 527 | 91 | 0.14 | Nitrogen | 16 | 0.6 | Nitrogen | 1.4 | 18.16 | 0.23 | 24 |
| Example 3 | 927 | 91 | 0.16 | Nitrogen | 16 | 0.4 | Nitrogen | 1.6 | 18.16 | 0.40 | 31 |
| Example 4 | 727 | 10 | 0.16 | Nitrogen | 16 | 0.2 | Nitrogen | 1.8 | 18.16 | 0.80 | 49 |
| Example 5 | 727 | 507 | 0.16 | Nitrogen | 16 | 0.4 | Nitrogen | 1.6 | 18.16 | 0.40 | 31 |
| Comparative Example 1 | 1027 | 91 | 0.16 | Nitrogen | 16 | 0.4 | Nitrogen | 1.6 | 18.16 | 0.40 | 31 |
| Comparative Example 2 | 427 | 91 | 0.16 | Nitrogen | 16 | 0.4 | Nitrogen | 1.6 | 18.16 | 0.40 | 31 |
| Comparative Example 3 | 727 | 1 | 0.16 | Nitrogen | 16 | 0.4 | Nitrogen | 1.6 | 18.16 | 0.40 | 31 |

*1Nonoxidative gas ratio = (Nonoxidative gas amount)/(Monosilane gas amount + oxygen gas amount)

period, and Si particles contained in the SiOx powder were subjected to examination for the presence or not of crystalline by X-ray diffraction measurement and calculation of particle diameters by Raman spectroscopic analysis in the same manner as in the above described Examples and Comparative Examples. The results are shown in Table 3.

TABLE 3

| | Irradiated laser type | Laser output mW | Irradiation time Min. | Presence of crystalline Si (X-ray diffraction) | Si particle dia. nm |
|---|---|---|---|---|---|
| Example 1 | He—Ne | 1 | 1 | YES | 3 |
| Example 2 | He—Ne | 5 | 20 | YES | 5 |
| Example 3 | Nd:YVO$_4$ | 30 | 1 | YES | 5 |
| Example 4 | Nd:YVO$_4$ | 100 | 50 | YES | 9 |
| Example 5 | He—Ne | 6 | 10 | YES | 7 |
| Comparative Example 1 | He—Ne | 1 | 1 | YES | 12 |
| Comparative Example 2 | He—Ne | 6 | 10 | NO | Not detected |
| Comparative Example 3 | Nd:YVO$_4$ | 30 | 1 | YES | 12 |

Example 6, Comparative Example 4

An aqueous solution containing 1 mass % of polyvinyl alcohol was mixed as a binder with the SiOx powder of Example 1 at a mass ratio of 10:1, and a shaped body having a diameter of 15 mm and a thickness of 2 mm was produced under a molding pressure of 10 MPa by a powder molding die and a press-molding machine, heated for volatilization and drying to solidify the binder in the atmosphere at 250° C. for two hours, and further heated and fired in the atmosphere at 500° C. for 30 minutes.

The surface of the obtained SiOx shaped body was irradiated with a He—Ne laser beam (a beam diameter of 1 μm, a wavelength of 633 nm, an output of 1 mW at the sample position) for scanning in a particular pattern form. The laser beam-irradiated portion was measured by a MicroRaman Spectrometer (Model LabRam HR-800 manufactured by JOBINYVON), and the diameter of the silicon particles contained in the SiOx shaped body was calculated from the shift value of the obtained Si raman spectrum to find that it was 2 nm. Then, the surface of the shaped body was observed through an optical microscope while an ultraviolet ray of a wavelength of 365 nm was irradiated. As a result, it was found that photoluminescence (PL) that emitted orange light in the same shape as the scanned pattern was observed on the portion to which the laser beam was irradiated, and the crystalline silicon particles contained in the SiOx film emitted light and could be applied to an optical device.

Meanwhile, where a shaped body was produced in the same manner as above using the SiOx powder of Comparative Example 1, photoluminescence (PL) was not observed.

Example 7, Comparative Example 5

An ethanol solution containing 1 mass % of polyvinyl butyral was mixed as a binder with the SiOx powder of Example 2 at a mass ratio of 10:12 to produce a slurry. It was used to form a coating having a thickness of about 20 μm on a tungsten (W) plate having a thickness of about 0.5 mm by a screen printer. It was heated in argon at 500° C. for one hour to volatilize the binder and also to fire.

The surface of the obtained SiOx film was irradiated with a Nd:YVO$_4$ laser beam (a beam diameter of 1 μm, a wavelength of 532.4 nm, an output of 10 mW) for scanning in a particular pattern form. The laser beam-irradiated portion was measured by the MicroRaman Spectrometer (described above), and the diameter of the silicon particles contained in the SiOx film was calculated from the shift value of the obtained Si raman spectrum to find that it was 5 nm. Then, a gold (Au) film was vapor-deposited on the surface of the SiOx film.

A laminated body comprising the above described tungsten, SiOx film and Au film was disposed within a vacuum chamber, and a laminated body which had an indium-tin oxide (ITO) layer and a phosphor layer formed sequentially on a glass plate was disposed such that the phosphor layer was faced to in parallel to the Au film surface of the previous laminated body with a gap of 2.5 cm between them.

The vacuum chamber was evacuated to $1.33 \times 10^{-5}$ Pa, a DC voltage of 12V was applied between the tungsten and the Au film of the laminated body comprising the tungsten, the SiOx film and the Au film such that the Au film became a positive electrode, and a DC voltage of 500V was applied between the Au film and the ITO layer of the laminated body comprising the glass plate, the ITO layer and the phosphor layer such that the ITO layer became a positive electrode. As a result, it was found that the phosphor layer on the glass plate emitted light in a pattern form in accordance with the laser beam irradiation pattern of the SiOx film, so that the crystalline silicon particles contained in the SiOx film of the laminated body comprising the tungsten, the SiOx film and the Au film emitted electrons and could be applied as a cold cathode which is one of electronic parts.

Meanwhile, an electron emission phenomenon was not observed when a film was produced in the same manner as above using the SiOx powder of Comparative Example 2.

INDUSTRIAL APPLICABILITY

The invention provides stably SiOx (X is 0.5 or more and less than 2.0) particles each containing therein a crystalline Si particle having a particle diameter of 1 to 10 nm, powder, and a shaped body. And, the crystalline silicon particles of the invention have a particular particle diameter of nanosize and produce a peculiar phenomenon in terms of light emission, electron emission and the like. Thus, the invention has a characteristic of providing a semiconductor element having a variety of properties. Therefore, the invention can be suitably applied as a novel functional material such as light-emitting elements, electronic parts and the like to a variety of uses and is very useful industrially.

The invention claimed is:

1. A method for producing SiOx particles, comprising irradiating SiOx, wherein x is 0.5 or more and less than 2.0, particles each containing therein an amorphous silicon particle having a particle diameter of 0.3-0.8 nm with light to produce SiOx, wherein x is 0.5 or more and less than 2.0, particles each containing therein a crystalline silicon particle having a particle diameter of 1 to 10 nm.

2. The method for producing SiOx particles according to claim 1, wherein the light is a laser beam.

3. The method for producing SiOx particles according to claim 1 or 2, wherein the SiOx particles containing therein the amorphous silicon particle having the particle diameter of 0.3-0.8 nm are obtained by reacting a monosilane gas with an oxidizing gas for oxidizing the monosilane gas under conditions of a pressure of 10 to 1000 kPa and a temperature of 500 to 1000° C.

* * * * *